June 30, 1959   T. LE BARON ET AL   2,892,500
ELECTRICALLY CONTROLLED STRIP SERVING MACHINE
Filed March 30, 1955   8 Sheets-Sheet 1

INVENTORS
THEODORE LE BARON
EARL B. DODDS
BY
ATTORNEYS

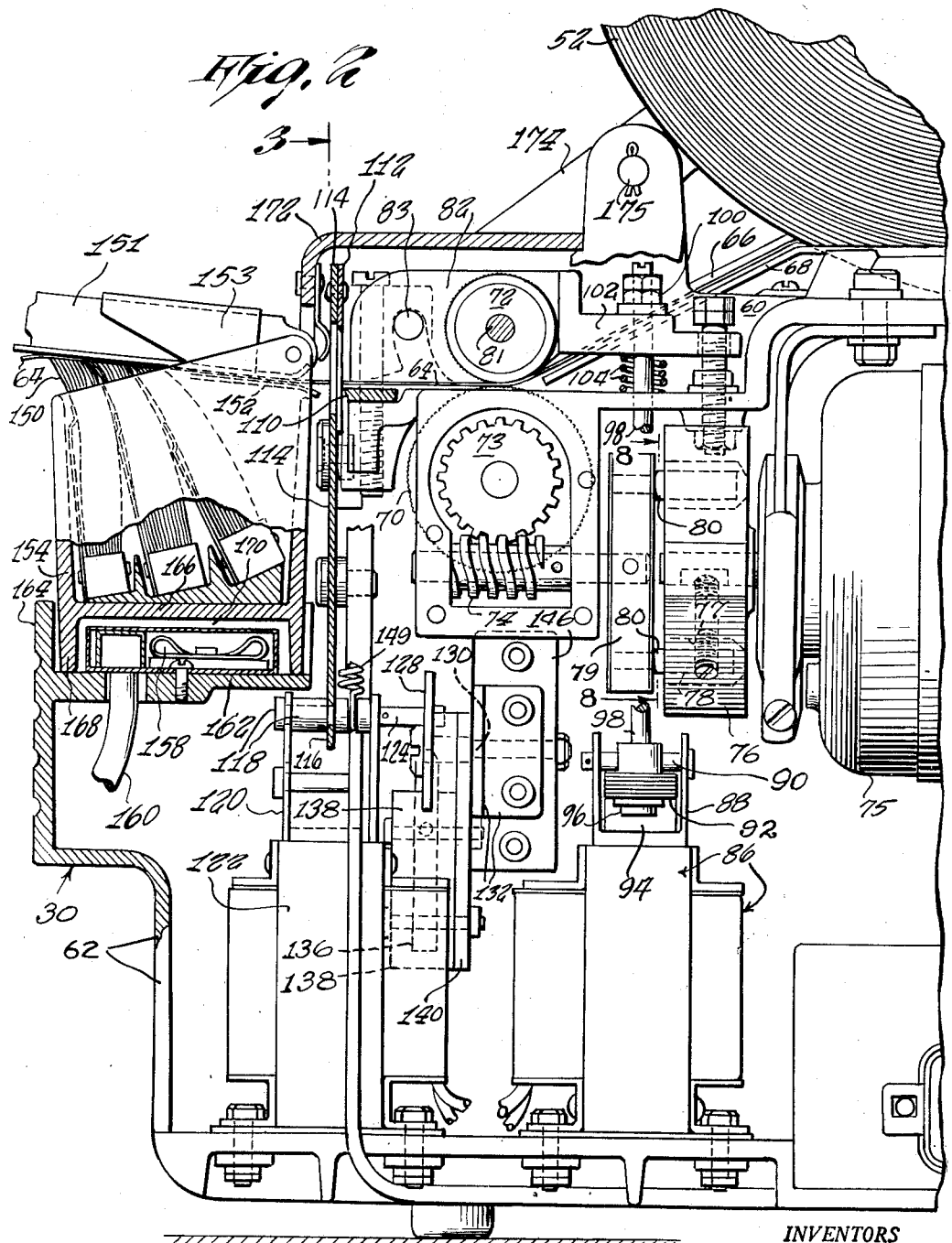

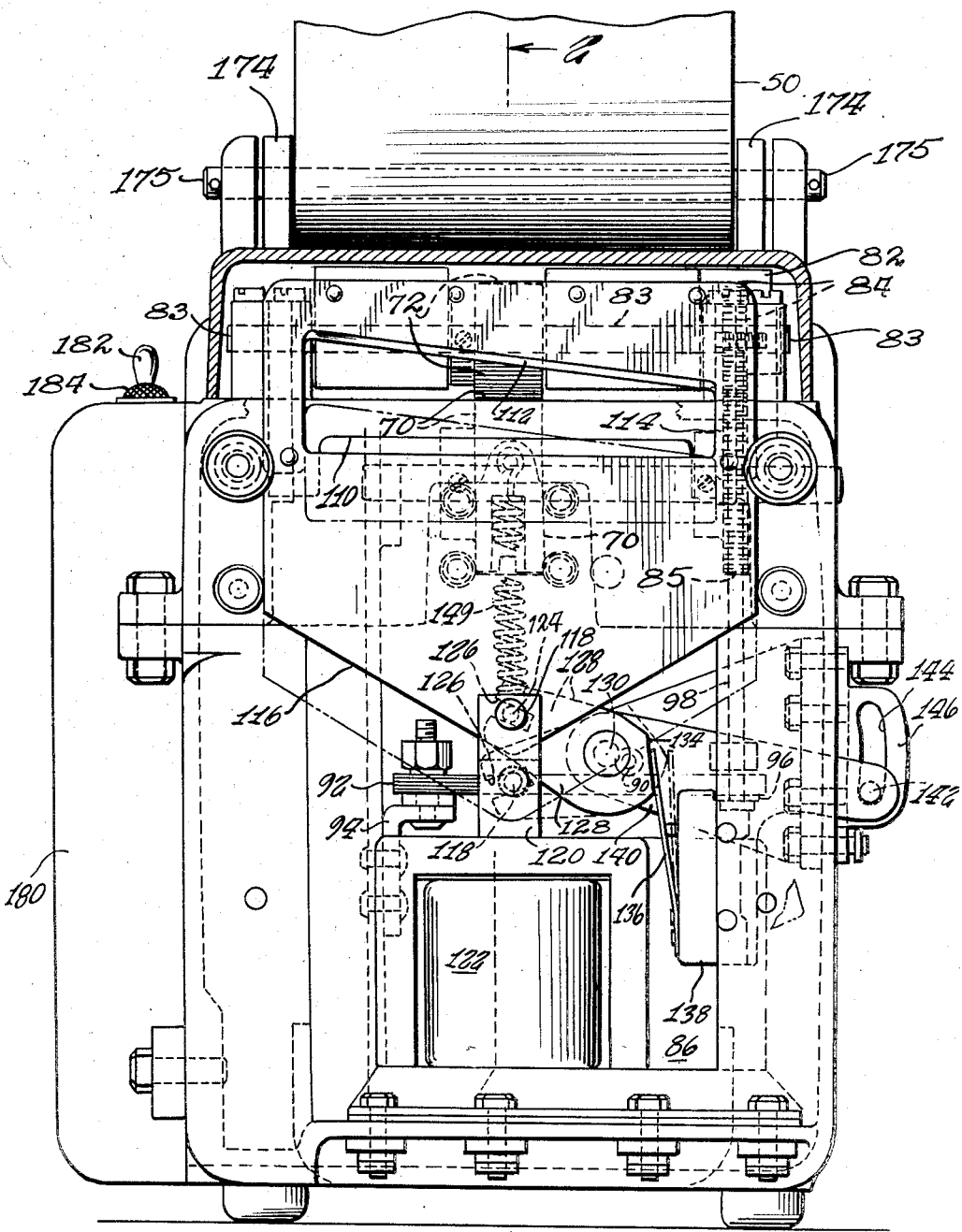

June 30, 1959 T. LE BARON ET AL 2,892,500
ELECTRICALLY CONTROLLED STRIP SERVING MACHINE
Filed March 30, 1955 8 Sheets-Sheet 4
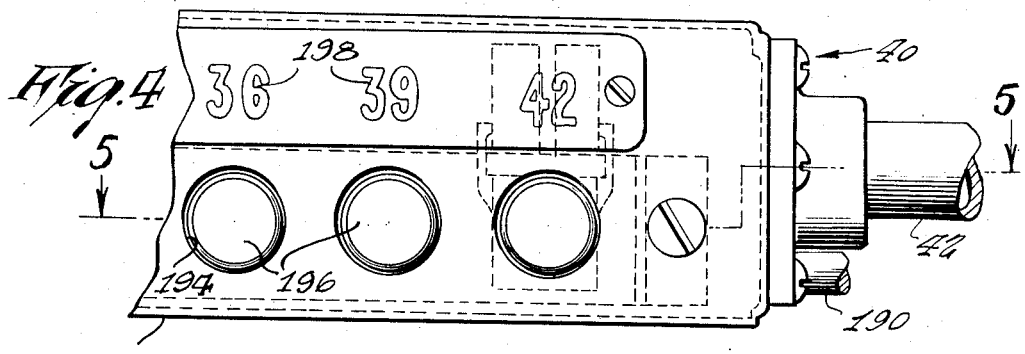
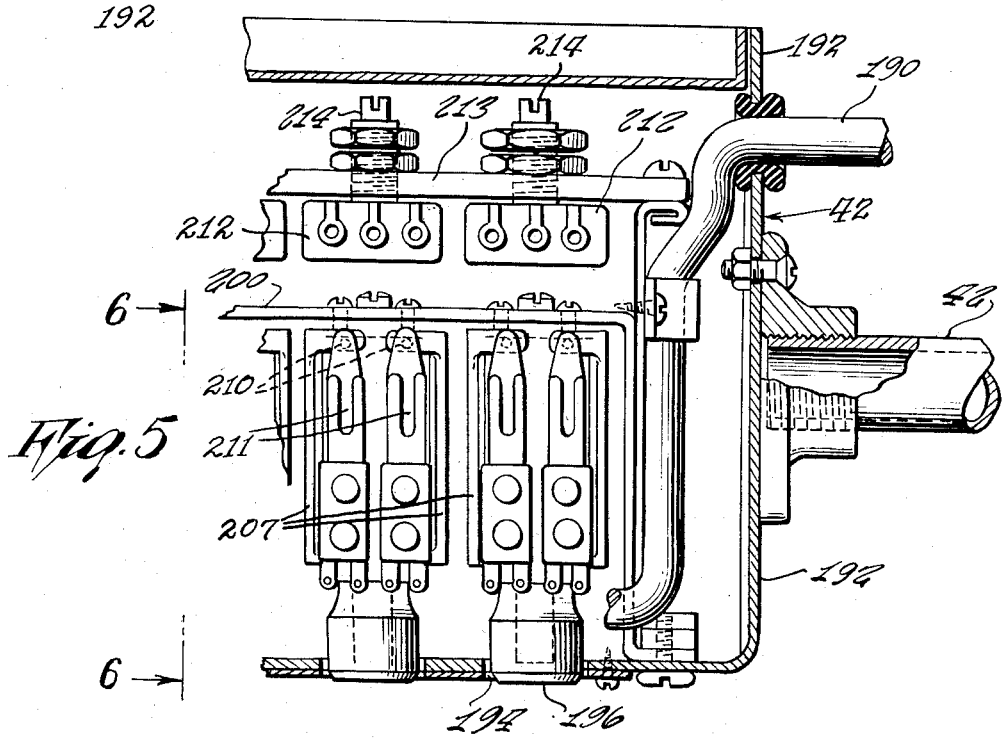
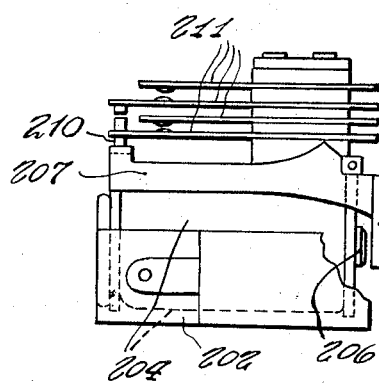
INVENTORS
THEODORE LE BARON
EARL B. DODDS
BY
ATTORNEYS June 30, 1959 T. LE BARON ET AL 2,892,500
ELECTRICALLY CONTROLLED STRIP SERVING MACHINE
Filed March 30, 1955 8 Sheets-Sheet 5

INVENTORS
THEODORE LE BARON
BY EARL B. DODDS
Moses, Nolte, Crews & Berry
ATTORNEYS

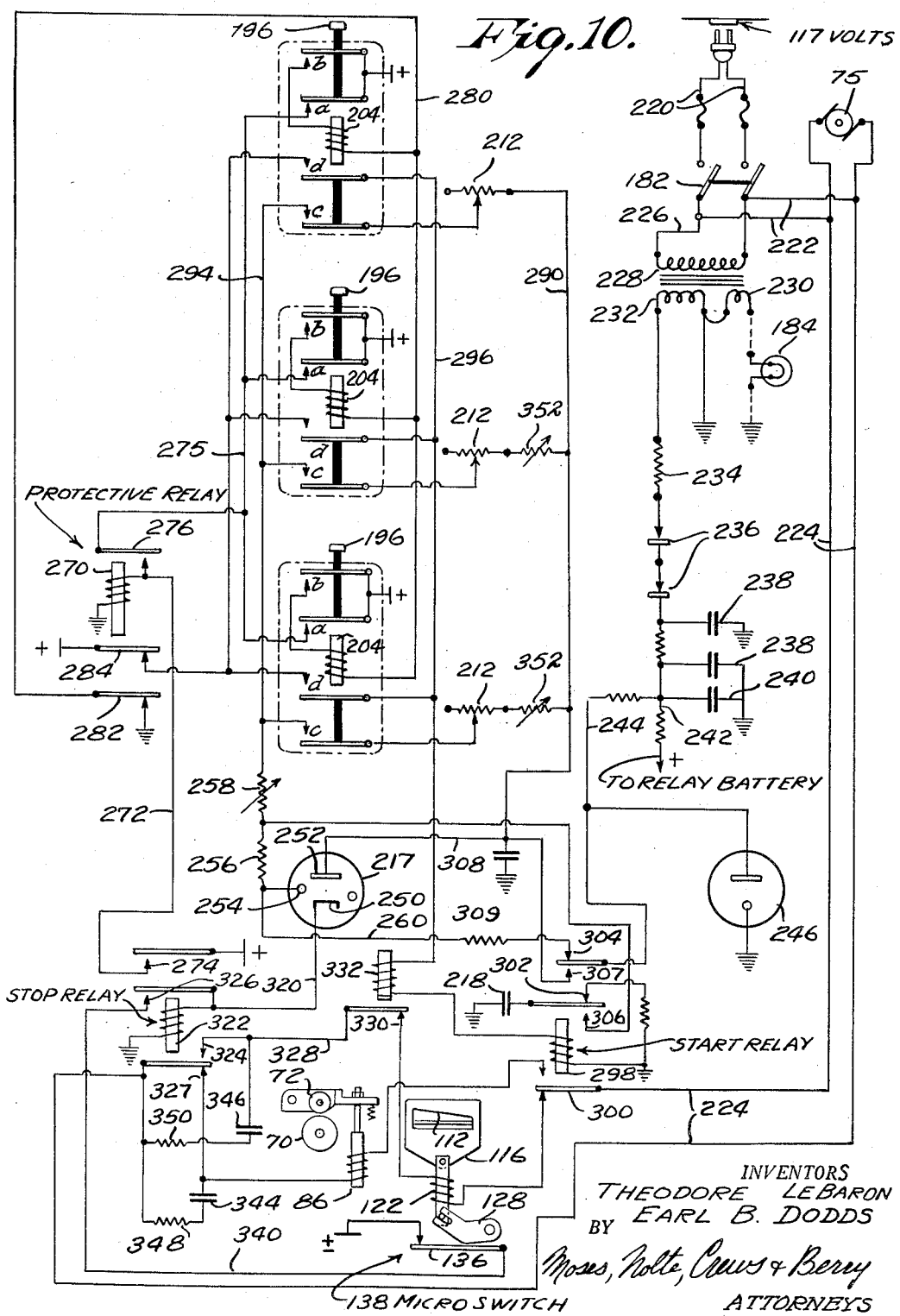

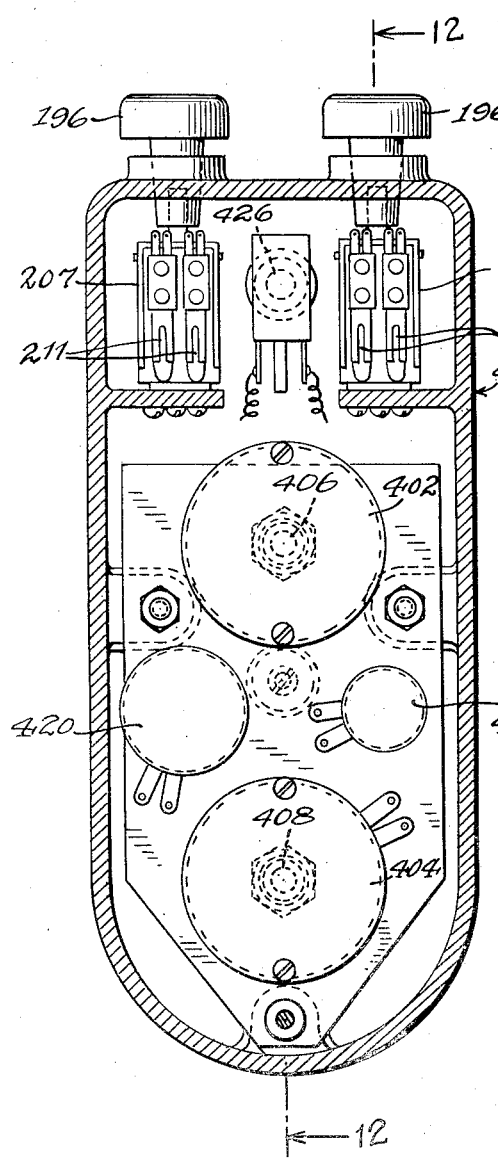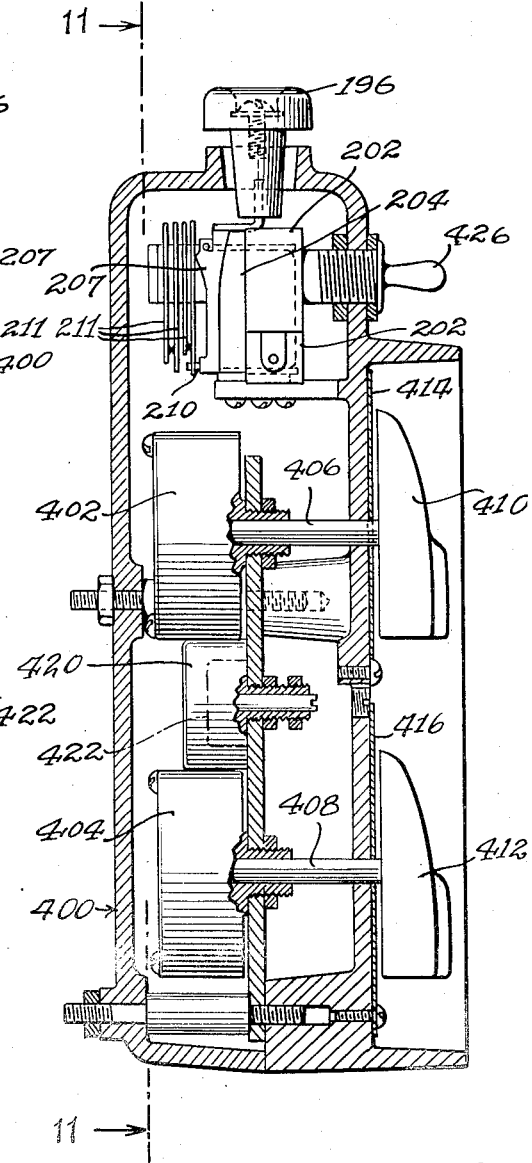

June 30, 1959     T. LE BARON ET AL     2,892,500
ELECTRICALLY CONTROLLED STRIP SERVING MACHINE
Filed March 30, 1955     8 Sheets-Sheet 8
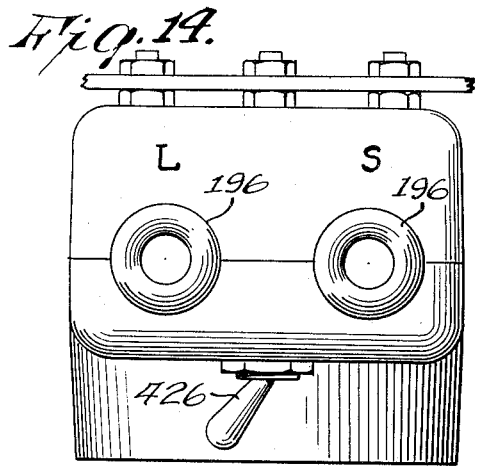
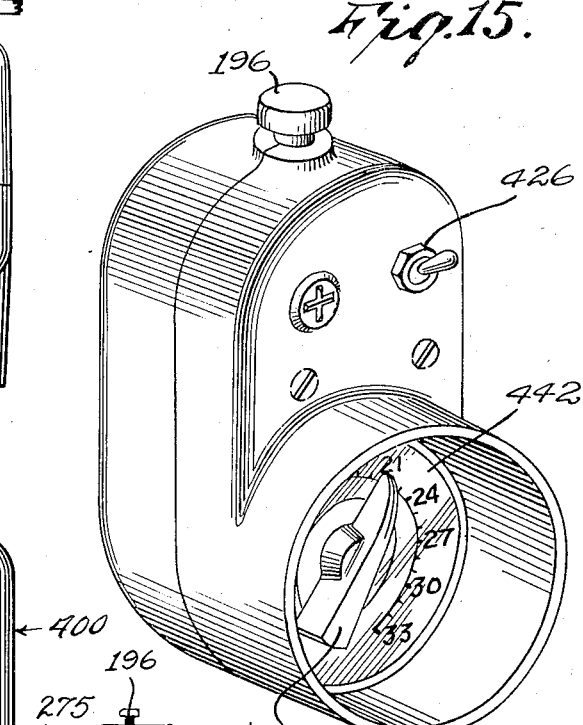
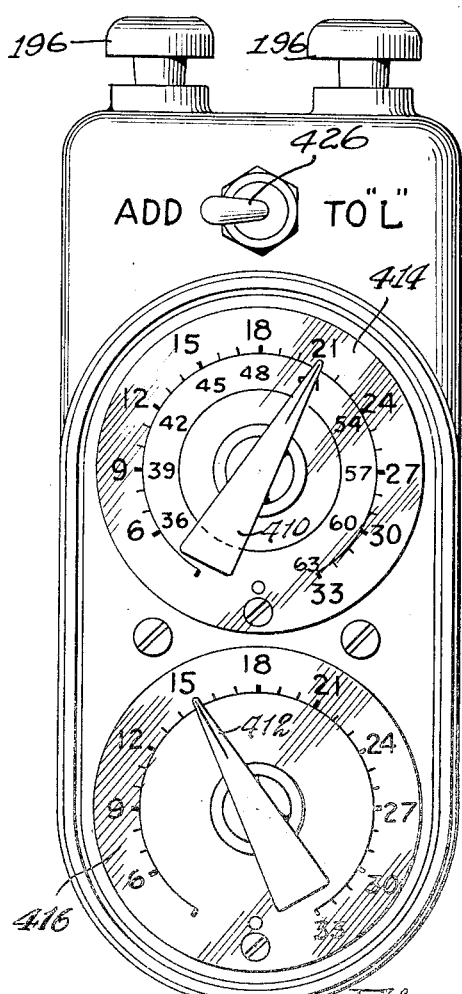
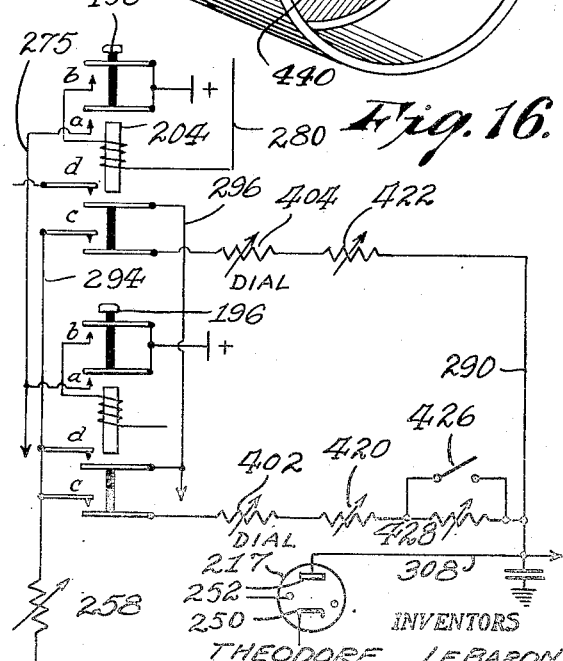
INVENTORS
THEODORE LE BARON
BY EARL B. DODDS
Moses, Nolte, Chairs & Berry
ATTORNEYS

United States Patent Office 2,892,500
Patented June 30, 1959

2,892,500
ELECTRICALLY CONTROLLED STRIP SERVING MACHINE

Theodore Le Baron, Oak Park, Ill., and Earl B. Dodds, Madison, N.J., assignors to Better Packages, Incorporated, a corporation of New York Application March 30, 1955, Serial No. 497,884

5 Claims. (Cl. 164—49)

This invention relates to strip serving devices and is particularly applicable to devices for serving gummed sealing strip or tape which is largely used in packaging and shipping rooms for the manual sealing of cartons and packages. Such strip serving devices may be roughly divided into two classes. First, those for use under conditions where the sizes of the cartons or packages are variable and in which the operator is therefore required to quickly select and use a length of tape suited to the particular size of package or seam to be sealed, the required length varying from package to package. The second class of devices is that in which a long run of cartons or packages of the same dimensions are required to be sealed in which case a single length only may be needed or in most instances two lengths for sealing the longitudinal and transverse seams of the package, respectively. The device of the present invention may be readily adapted for handling either class of work.

The invention disclosed herein relates to the type of electrically controlled strip serving machine disclosed in United States Letters Patent No. 2,408,363, dated October 1, 1946, to C. E. Beckman and E. B. Dodds.

The invention contemplates the utilization of an electrical timing circuit for measuring purposes in which the tape is fed at a predetermined speed for a time interval fixed by the timing circuit, which may be adjusted or preset so as to cause a delivery of the desired specific tape length. In particular, the use of an electric time measuring circuit is preferred in which the internal condition of the electric circuit when closed progressively changes so as to determine the duration of the tape feeding operation in accordance with the condition of the circuit, and not by reason of the physical movements of the tape or of mechanical parts associated with the feed thereof.

Sealing machines of the character described have many advantages over numerous types of strip serving machines which have been heretofore proposed. It is possible to provide a machine of this character in which the operation of selecting the length of strip to be delivered is instantaneously accomplished by the mere touch of a button, whereupon the machine will deliver the exact length of tape selected. The whole operation may be made very rapid and very accurate. This type of machine is superior to machines in which the operator merely estimates the amount of tape fed. It also may be operated faster than machines where the operator has to measure or attempt to measure the tape as it is delivered by visual or other means, or in which he has to move a delivery element or the like through a distance corresponding with the estimated tape length required.

The invention is particularly applicable to machines in which the tape is fed by a power device such as a constant speed electric motor rather than by hand or foot power. Machines of the latter character are apt to be inaccurate because errors are introduced depending upon the vigor with which the tape delivery devices are actuated. Variable rates of delivery also interfere with uniform wetting of the tape, too much water being applied if the feed is too slow, and too little if the feed is too fast. In machines embodying the present invention it is possible to feed the tape at a uniform speed from start to stop and thereby secure a uniform application of moisture.

Machines have also been proposed for delivering measured lengths of tape depending upon the mechanical movement of elements driven in accordance with the operation of the feeding devices and also by devices intended to be operated by contact with the tape itself. These machines, however, present mechanical complications and when dependent upon actuation by the tape, are subject to difficulties due to the unstable quality of the tape, its likelihood of buckling, curling and sticking, and other objections.

In accordance with the present invention, the control being entirely electrical, it is possible to locate the push buttons, switches or other operating devices at the most convenient position for observation and actuation by the operator, such elements being connected to the actual tape delivery elements merely by wires. Close mechanical connection is thus unnecessary. It is also possible by simple changes in the electrical circuits to vary the character of the operation of the machine. For example, a bank of push buttons may be provided, each corresponding with a different length, thereby enabling any one of several lengths of tape to be selected, or a two key arrangement may be utilized, where only two predetermined lengths of tape are required. Another possible arrangement is the use of a single key or switch with a dial arrangement by which the machine may be set to deliver the desired length repeatedly until a change in the dial setting is made. Any one of these variations may be incorporated by very simple changes.

Among the important objects of the invention may be mentioned the provision of a compact and simple key board arrangement which may be mounted in a position in front of the eyes of the operator, where it may be most easily seen and manipulated, while the actual tape delivery mechanism is mounted to deliver the tape in a position where the operator may grasp it and apply it to the package with the least unnecessary movement.

Another object of the invention relates to an improved key construction in which the keys may be merely touched by the operator to close a first circuit, after which further actuation is entirely by electro-magnetic means. This produces a key having an exceptionally light touch.

Another object of the invention is to provide a timing circuit system which is maintained at all times after the main switch is closed in an instantly ready condition for operation, so that whenever it is desired to serve a strip, the action will be immediately initiated upon the pressure of the desired key without any delay due to warming of the tubes or similar conditions.

Another object of the invention is to provide a protective circuit arrangement which will prevent false operation or jamming of the dispenser in case more than one key or switch is actuated at a time, or in case a second key is pressed before the completion of the previous dispensing operation.

Another object of the invention is to improve the means for cutting the tape so as to insure that the cutting will take place only after the feeding motion of the tape has stopped, and also to provide means whereby the operation of the cutter may be adjusted to produce proper cutting of different kinds of tape.

Other objects and advantages of the invention will appear in the course of the description of certain preferred embodiments of the invention chosen to illustrate the principles thereof.

In the accompanying drawings forming a part of this specification:

Figure 2 is a side view of the machine with one of the side plates removed and partly in section on line 2—2 of Figure 3, portions being broken away;

Figure 3 is a vertical transverse sectional view on line 3—3 of Figure 2, parts being shown in elevation;

Figure 4 is a front elevation of a part of the key board;

Figure 5 is a horizontal section on line 5—5 of Figure 4;

Figure 6 is a side elevation of one of the key units viewed from the position 6—6 of Figure 5;

Figure 10 is a schematic wiring diagram of the dispenser;

Figure 11 is a vertical section taken on line 11—11 of Figure 12 showing a two-length control selector;

Figure 12 is a vertical section on line 12—12 of Figure 11;

Figure 13 is a front elevation and Figure 14 a top plan view of the two-length control selector shown in Figure 11;

Figure 15 is a perspective view of a single key adjustable length selector; and

Figure 16 is a schematic wiring diagram of the two-length control selector.

In the accompanying drawings, a typical embodiment of the invention is illustrated in which a tape dispensing unit having tape feeding, moistening and cutting means is mounted on a shipping bench and a keyboard is adjustably mounted on a standard adjacent to the tape dispensing unit, the keyboard being connected to the unit by a wire cable so that it may be freely adjusted as to location with respect to the dispensing unit. It will be understood that the modes of mounting the dispensing unit may be varied to suit particular conditions of use, and that the electrical control system may be utilized with tape dispensing instrumentalities differing in character or detail from those about to be described.

Figure 1:
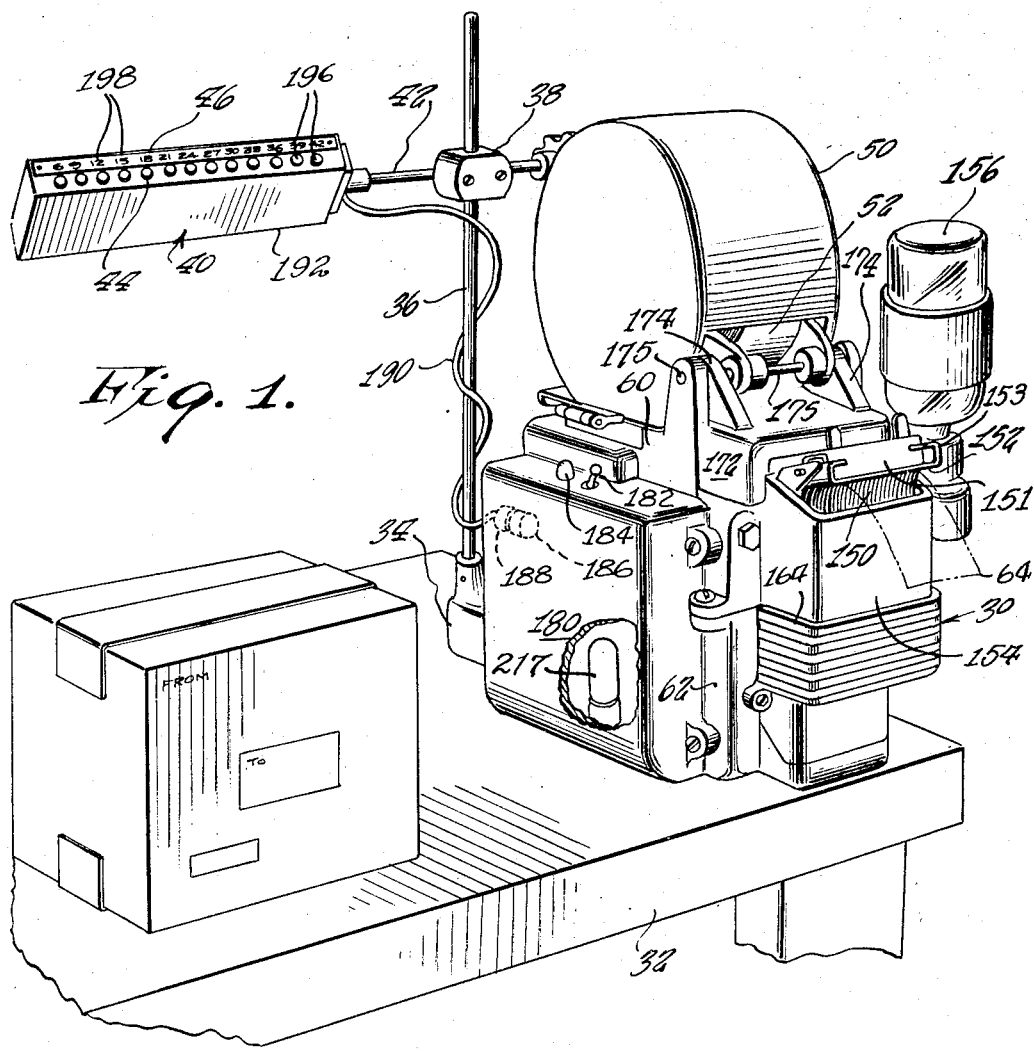
Figure 1 is a perspective view showing a tape feeding mechanism mounted on a shipping room bench and showing the key board adjustably mounted at a point removed from the feeding means and in the most advantageous position for observation and actuation by the operator.

Referring to the drawings in detail, Fig. 1 shows a tape dispensing unit 30 mounted on a bench 32 on which is also located a base 34 carrying a standard 36 on which a fixture 38 is mounted for vertical adjustment. The key board or switch assembly 40 is carried by a horizontal arm 42 adjustably mounted in the fixture 38. This adjustment may be both longitudinal and rotary. The keyboard may thus be placed in the most desirable position for the convenience of the operator in observing the keys 44, and their accompanying length designations 46, and to permit the desired finger control of the keys. Where a number of keys are provided, these are preferably arranged in a horizontal row in a long narrow casing, as shown. The arrangement of the keys and the accompanying designating numbers in a horizontal row makes the selection of the proper number and key particularly easy for the operator, and is sometimes found superior to the arrangement of the keys and numbers in a vertical column.

*Tape feed*

Figure 8:
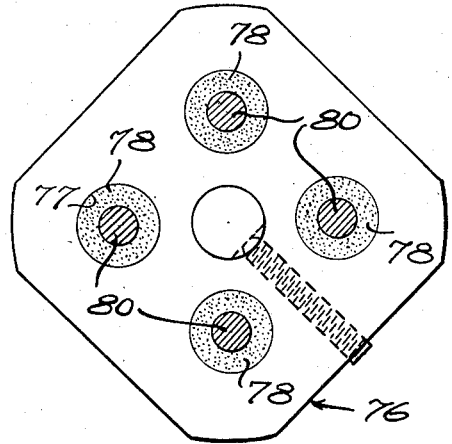
Figure 8 is a vertical sectional view on line 8—8 of Figure 2 showing one member of the driving coupling.
Figure 9:
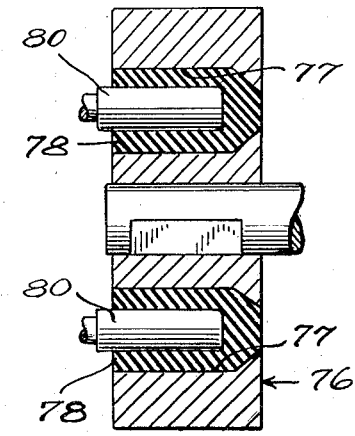
Figure 9 is a vertical sectional view on line 9—9 of Figure 8.

The particular tape dispensing unit chosen for illustration comprises a receptacle 50 in which is placed a roll of gummed tape 52, the receptacle being mounted on the top 60 of the casing 62 of the unit, and being provided with suitable doors or openings permitting replacement of the tape roll. As shown in Fig. 2, the tape strip 64, coming from the roll 52, passes downwardly and forwardly between the guide plates 66 and 68 and between the feed rolls 70 and 72. The lower roll 70 is driven by a worm wheel 73 and worm 74 from a constant speed electric motor 75. The motor is shown as connected to the shaft of the worm 74 by means of a flexible coupling assembly which comprises a coupling member 76 forming a flywheel fixed to the motor shaft and having sockets 77 (Figures 8 and 9) therein in which are mounted sleeves of rubber or the like 78. The member 76 may also be formed to act as a fan for cooling the motor. For this purpose it is shown as formed of a general rectangular shape with round corners, this shape stirring the air sufficiently. The other member 79 of the coupling is mounted on the worm shaft and has pins 80 which fit in the rubber sleeves 78 in the sockets 77. A considerable degree of flexibility is thus provided between the two coupling members.

The roll 72 is journaled on a shaft 81 in a yoke 82 which is pivoted on the pintle 83. When the yoke is swung downwardly, by means to be described, pressure will be applied by the roll 72 upon the tape thereby causing it to be gripped between such roll and the driven roll 70 thereby feeding the tape. When the pressure on the roll 72 is released, the feed of the tape will stop, even though the rolls continue to rotate. Preferably the roll 72 is constantly rotated with the roll 70, being geared thereto by the gears 84 and 85 which remain in mesh even when the rolls are separated the slight distance necessary to release the tape.

The means shown for drawing down the yoke and producing the gripping pressure between the rolls 70 and 72 comprises a solenoid 86 connected to the yoke through suitable linkage. As shown the armature of the solenoid carries a pair of ears 88 which carries a cross pin 90. This pin is arranged to press down a multiple plate spring 92 when the solenoid is energized. This spring is shown in Fig. 3 as mounted at one end on the bracket 94 on the frame of the machine, the free end of the spring engaging a head 96 adjustably mounted at the lower end of a pull rod 98, the upper end of which carries a head 100 bearing upon an arm 102 projecting from the yoke 82. The arm 102 is supported by a spring 104 which normally, that is when the solenoid is deenergized, holds the yoke 82 in a raised position with the roll 72 out of gripping engagement with the tape and roll 70, so that tape is not being fed.

*Cutting means*

The tape strip 64, after being fed forward by the feed rolls, passes between a pair of shear cutters, the lower one of which comprises a stationary plate or ledger blade 110. The upper member of the shear comprises a diagonal cutter 112 which is mounted on a cutter frame 114 which is shown as having a lower edge in the form of a broad V 116. At the apex of the V is a pin 118, which is connected to arms 120 carried by the plunger of the cutter operating solenoid 122. The pin 118 has an extension 124 which is engaged by a notch 126 in the end of cam lever 128 pivoted on a stud 130 carried by a bracket 132 on the frame of the machine. The cam lever 128 has a cam face 134 which is adapted to actuate the spring lever 136 of a microswitch 138. The microswitch 138 is mounted on a bracket plate 140 one end of which is pivoted on the stud 130. The other end of the plate 140 carries a clamping screw 142 which is slidable in a slot 144 in a plate 146 fixed to the outside of the casing. By changing the position of the screw 142 the plate 140 may be swung about the stud 130 so as to adjust the position of the micro-switch with respect to the cam face 134. The micro-switch is so related to the circuit of the cutter solenoid 122 that when the switch is actuated by the cam it will break such circuit. When the solenoid is de-energized the cutter frame and blade 112 are held in upward position by a coiled spring 149.

By adjusting the position of the micro-switch 138, the point in the travel of the cutter at which the switch will operate may be set. The cutter blade will be positively drawn down by the solenoid to this point which will be so determined as to insure the complete severance of the tape. This adjustment will be varied depending upon the type and thickness of the tape to be severed. After the micro-switch has been actuated to open the circuit the armature continues through the remainder of its travel by its own inertia before being returned by the spring. This arrangement insures that the tape will be completely cut off, while at the same time providing some easing of the shock on these parts by allowing the cutter to slow down towards the end of its travel.

Tape moistening means

After passing the cutter the tape strip 64 passes over a moistening brush (or plurality of brushes) 150 against which it is held by a weighted pressure plate 151. Preferably the tape on the way to the brush passes over the surface of a guide plate 152 the ends of which are bent upwardly to form clips 153 by which it is supported below the pressure plate 151. The moistening brushes 150 are mounted in a water tank 154 which may be kept supplied with water from an inverted reservoir 156. Means are preferably provided for keeping the water in the tank hot. That results in a better penetration of the moisture into the adhesive on the tape. In the construction shown, the tank is heated by means of an electrical heating element 158, supplied with current by a wire 160. Heretofore when heated water tanks have been used in tape moisteners, the heating element has been incorporated as a part of the tank. This was objectionable as it required wire connections through the tank which interfered with ready removal of the tank for cleaning. In accordance with the present invention the heating element 158 is mounted on a plate 162 which forms a part of the fixed frame of the unit, and which is surrounded by a flange 164. The tank 154 has a raised bottom 166 which is surrounded by a downwardly projecting flange 168 adapted to fit within the flange 164 and rest upon the plate 162. The tank bottom 166 and flange 168 define a recess 170 in which the heating element is received. Thus the tank is effectively heated while at the same time it may be readily lifted out for emptying out the water and cleaning.

A pivoted cover plate 172 having ears 174 pivoted on a pintle 175 is preferably provided for covering the feed rolls and cutter mechanism.

From the foregoing it will be seen that the essential operating parts of the tape feeding unit comprise a driving motor 75, the feed rolls 70 and 72, the feed solenoid 86 and its connections by which the rolls are caused to grip or release the tape, the cutter shear actuated by the cutter solenoid 122, and the tape moistening brushes 150 and associated parts.

Control unit

Mounted on the side of the casing 62 is the control unit which is enclosed within a removable cover 180. In the control unit are mounted the necessary switches, resistors and tubes, to control the operation of the feed and cutter solenoids. Mounted on top of the control unit is the main switch 182 and preferably also a pilot light 184 which lights up when the main switch is closed. Mounted on the back of the control unit is a socket 186 in which is adapted to be plugged a multiple contact plug 188 on the end of a flexible cable 190 which leads to the keyboard or switch assembly 40.

Key construction

Figs. 4, 5 and 6 show the key or finger switch construction indicated generally in Fig. 1 by the numeral 40. This construction in its preferred form includes a box or casing 192 shown as mounted on the end of the adjustable arm 42. In the front of the casing are a plurality of holes 194 through which are exposed the key tops or push buttons 196. On the front panel above the keys are length designating figures 198, each figure being associated with a key. The key mechanisms are supported by a bracket 200 on the inside of the casing 192. In the construction shown each key unit comprises a fixed frame member 202 carrying a coil 204 having a pole piece 206. Pivotally mounted on the frame 202 is a bell crank 207, one part of which carries the armature 208 which is mounted in a position to be influenced by the pole piece 206. The key top or button 196 is carried on a piece 209 welded or otherwise permanently secured to the armature 208. The other arm of the bell crank 207 carries protuberances 210 adapted to engage the first pair of a series of contact blades 211 and actuate such blades so as to close the first and second pairs of contacts, the second closing pair of which is arranged in the circuit of the coil 204. A light touch of the key is sufficient to actuate the bell crank to close these pairs of contacts, whereupon the coil 204 is energized and its attraction of the armature will cause the remaining pairs of contacts to be successively closed. The key is in effect quickly drawn away from the operator's finger and no further effort on the part of the operator is required. Such a key therefore may be described as a "magnetically assisted" key.

The magnetically assisted key construction above described is not specifically claimed herein, as it forms the subject matter of a divisional application for patent, Serial No. 768,398, filed October 20, 1958.

A resistor having a different specific resistance is associated with each key and is preferably located directly adjacent to the key in the casing 192. As shown in Fig. 5 for example, a series of resistors 212 is mounted on a bar 213 in the casing 192, one resistor being associated with each key. Each resistor is preferably of the variable type and is provided with a screw driver adjustment 214 by which it may be set at the proper value to cause deliveries of the lengths of tape called for by the associated key.

The circuits controlled by the keys will be described below.

Electrical tape length measuring system

Measurement of the tape depends upon the length of time that the feed rolls are held pressed together by the feed solenoid 86, the motor 75 by which the feed rolls are driven being of a constant speed type. When any one of the keys above described is pressed the circuit through the solenoid 86 is closed, thereby initiating the feed of the tape, and at the same time electrical devices are prepared in such a way that after the passage of the necessary interval to permit the desired length of tape to be fed, the circuit through the solenoid 86 is broken, whereupon the feed will immediately cease, and thereafter the cutter solenoid is actuated to cut off the piece of tape. The measuring system illustrated utilizes a tube 217, Fig. 10, in the form of a three element miniature gas triode or thyratron preferably of the cold cathode type. Connected to this is a capacitor 218. Each key has associated with it a specific resistance (212) corresponding with the appropriate time interval to feed a definite length of tape, and when the key is closed the circuit is closed through this resistance and the capacitor 218. The amount of resistance determines the length of time it will take the capacitor to build up a sufficient voltage. This voltage ionizes the gas and breaks down the resistance between the anode and cathode of the thyratron, so as to cause the latter to fire, and thereby stop the operation of the tape feeding and cause the cutter to actuate.

A typical schematic wiring diagram is shown in Fig. 10. The leads 220 may be plugged into any ordinary A.-C. power circuit, such as the usual 117 volt lighting circuit. These leads are connected to the main switch 182 from which wires 222 lead to the driving motor 75, while branch wires 224 lead to the feed solenoid 86 and cutter solenoid 122. Other wires 226 lead from the main switch to the primary winding 228 of a transformer which is preferably provided with two secondary windings 230 and 232. The low voltage secondary winding 230 merely provides current for the pilot light 184. The winding 232, which is a high voltage winding, provides rectified current for the control circuits through a suitable arrangement of resistors 234 and rectifiers 236. The latter may be of any suitable type, but selenium rectifiers are preferable. Filter condensers 238 and 240 are also provided as needed, and the rectified current is divided at the output of the last filter condenser 240 into two portions, one following the conductor 242 to supply battery for the control relays, the other part of the current passing through conductor 244 to the measuring circuits through the voltage regulating tube 246.

The thyratron is shown as having the usual cathode 250, anode 252 and control electrode 254. A protective resistor 256 in series with the control electrode limits the current flow through this element to a safe value. A calibrating resistor 258 is also provided in connection with the tube by which slight changes or adjustments in the overall timing values may be made to compensate for variables such as aging of various circuit elements and extremes of ambient temperature. This resistor should have an adjustment available only to the technician. By means of a conductor 260 a low value current is applied to the control element 254, as soon as the main switch of the apparatus is closed. The current flow from the control element to the cathode amounting only to a few micro amperes, does not affect the main gap of the tube. There is also no voltage applied to the anode at this time. This circuit path between the control electrode and the cathode, which is closed whenever the machine is turned on but standing idle, causes a cloud of ions in the tube to be available whenever the machine is called on to measure tape. It greatly reduces the inherent instability of the thyratron and causes the machine to deliver the same length of tape on the first operation after an extended idling period, as on succeeding operations. Thus the thyratron is maintained at all times in a constant state of readiness.

In the example of the invention illustrated in Figs. 1 and 10, a series of keys 196 is provided each actuating a magnetically assisted unit of the type shown in Figs. 4, 5 and 6 as already described. In the particular construction shown there are two groups of blades or spring pile-ups actuated by each key, so that there are in all four contacts $a$, $b$, $c$ and $d$, which are so adjusted as to close in that sequence. The contacts of the several keys are supplied with power from the conductors 242 and 244, so that all of the keys are ready to be activated at all times when the main power supply is turned on.

In order to prevent interference by the premature operation of a key during a feeding cycle, and thereby prevent the feeding of a second piece of tape until the feed of a first piece of tape has been completed, a protective circuit and relay are provided to which all of the $a$ contacts of the several key relays are connected. If the condition of the circuit is such that the machine is ready for initiation of a feeding cycle by pressure upon the key, this is determined upon the closing of the $a$ contact, whereupon the cycle continues. If the machine is not ready for operation, the closure of that contact will not permit the cycle to proceed.

Movement of the key necessary to close the $a$ contact need be very slight. For example .003″ is usually sufficient for this purpose. A slight further movement of the key, for example .002″, will close the $b$ contact of the key. If the protective circuit is clear this closes the circuit of the relay battery supply through the winding of the key relay 204, which causes the key to operate through the remainder of its travel by means of its own winding, and because it is actually pulled away from the finger, gives the key a very light and rapid "touch" or "feel." Further movement of the key under the influence of the winding next closes the $c$ contact of the key and finally the $d$ contact.

*Protective circuit*

The protective cricuit includes relay 270 which is energized through a wire 272 and contact 274 with power from the rectified voltage wire 242. The contact 274 is normally open when no tape feeding operation is taking place, but after the initiation of a feeding operation, it will be closed, as will be described below, and will remain closed until a particular feeding cycle is completed, whereupon it will open again. The protective relay is also provided with a locking circuit including a conductor 275 which is connected to all of the $a$ contacts and also to a contact 276. The contact 276 is normally open but if the relay has been energized due to the fact that the contact 274 has been closed, then, when a key is pressed and an $a$ contact closed, the circuit will be established from the $a$ contact through the conductor 275 and the contact 276, which will keep the relay 270 energized so long as the $a$ contact is held closed, even though the contact 274 may, in the meantime, have opened.

The normal condition of the protective circuit when the apparatus is ready to receive the impulse from the closing of a key necessary to deliver a piece of tape is shown in Fig. 10. Closing of an $a$ contact will in this condition of the protective circuit be without effect as contacts 274 and 276 are open. The corresponding $b$ contact will next be closed by further pressure on the key. This will close the circuit through the coil of relay 204 which receives power from the rectified voltage cvonductor 242 by way of the wire 280, and normally closed contact 282 of the protective relay to ground. The protective relay also has a contact 284 which is connected to the rectified voltage source 242 and is in effect the main source of power supply to the circuit initiating the feed of tape to be described. This contact 284 is normally closed when the protective relay is not energized as shown. The closing of the circuit through the relay 204 closes the contacts $c$ and $d$ as previously described. If at the time of the first pressing of the key, however, the protective relay 270 happens to be energized, then the contacts 282 and 284 are open, the circuit through the relay 204 is not closed and power is not supplied due to the open contact 284. Assuming, however, the start of a normal operation when the protective relay is de-energized, the contact $c$ is next closed, and this prepares a path from the regulated voltage source 244, and conductor 290 through the specific resistance 212 appropriate to the key being actuated and through conductor 294 leading to the thyratron.

*Feeding and measuring cycle*

The last movement of the key will close the $d$ contact which, through a conductor 296, closes a circuit through the winding of a relay 298 which may be termed the "start" relay. The start relay operates a contact member 300 which in its up position closes a circuit from the A.-C. supply lead 224 through the winding of the feed solenoid 86, thereby initiating the feed. The start relay also opens the contacts 302 and 304 and closes the contacts 306 and 307. The closing of the contact 307 supplies regulated voltage from conductor 244 to the conductor 290, above described, and also initiates the application of voltage to the anode 252 of the thyratron through the conductor 308. The opening of the contact 304 cuts out the high resistance 309 which is limiting current flow to the control elevtrode 254. The opening of contact 302 opens the short circuit which has completely discharged the capacitor 218. Closing of contact 306 connects the capacitor 218 with the thyratron. The capacitor voltage now starts to build up and after the interval of time determined by the value of the specific key resistance 212 the main gap of the thyratron will break down and current will flow through the conductor 320 connected to the cathode 250. The conductor 320 is connected to the winding of a second relay 322 which may be termed the "stop" relay. This relay is arranged to close contacts 324, 274 in the protective circuit, and 326, and to open contact 327. Closing the contact 274 energizes the protective relay 270 and opens contacts 282 and 284. Opening of contact 282 breaks the circuit through the relay 204 of any key which may have been pressed thereby releasing such key, and the opening of the contact 284 also breaks the circuit through the d contact of the previously closed key and thus through the relays 298 and 332. Breaking of the circuit through relay 298 releases the contact member 300 which returns to its lower position and prepares the circuit, so far as this contact is concerned, from the cutter solenoid 122. Opening of the contact 327 breaks the circuit through the feed solenoid 86 and thereby stops the feed. At the same time closing of the contact 324 prepares the circuit through conductor 328 leading to the cutter solenoid 122. This circuit, however, is at this time broken by the contact 330 of a delayed action relay 332. The latter is in series with the start relay 298. Upon breaking of the circuit through the relays 298 and 332 as described, and after slight delay caused by the slow release of the delayed action relay 332, the contact 330 will close, thereby completing the circuit through the cutter solenoid 122 and causing the latter to actuate the cutter to sever the tape. The delayed action relay 332 prevents any possibility of the cutting operation occurring until the tape has had a chance to come to a complete rest. This delay need be very slight, for example on the order of 0.2 second.

The momentary discharge from the thyratron energizes the stop relay 322 and causes the latter to close the contact 326 and thereby establish a holding circuit through the conductor 340 and the normally closed micro-switch 138 so that the stop relay and cutter relay remain energized until the cutting of the tape is completed whereupon the micro-switch is opened by the cam 128 actuated by the armature of the cutter solenoid 122 at some point in its travel as described above. Until this occurs the contact 274 is held closed so that the protective relay 270 is energized and the protective circuit is effective as above described. The opening of the micro-switch by the cam 128 marks the end of the cycle, de-energizing the stop and protective relays and placing the circuits in condition for the next operation. Condensers 344 and 346 and resistors 348 and 350 may be provided as needed to limit the burning of the contacts of the stop relay.

It will be seen that the protective relay 270 becomes energized the instant that the stop relay 322 is actuated by the firing of the thyratron. Relay 270 will remain energized in any case until the opening of the micro-switch by the cam at the completion of the cutting stroke. It will remain energized after the opening of the micro-switch due to the closure of the locking contact 276 if any key is being pressed while the contact 274 is closed. Thus the protective relay system prevents false operation of the machine due to pressing a second key before the previous feeding cycle has been completed. If two keys are pressed simultaneously at a time when the protective relay is de-energized, the only effect will be to deliver a short piece of tape due to the fact that two paths will be closed to the thyratron, thereby causing it to fire prematurely. No harm will result from this except the loss of of the short piece of tape.

In order to insure that each key will deliver the length of tape designated for it, calibrating means are desirable as the elements of each timing circuit may differ somewhat from the intended characteristics. The calibrating resistor 258, referred to above, affects all of the timing circuits and it may be so set as to bring one of the timing circuits, for example the first one or last one as indicated for example at the top of Figure 10, so that such circuit will deliver the intended length of tape. However, an additional calibrating or compensating means should be associated with each of the other timing circuits so that they may be individually adjusted to bring them into agreement with the tape lengths which each of them is intended to dispense. Such calibrating means preferably in the form of potentiometer type resistors are indicated at 352, one being associated with each timing circuit after the one at the end of the series.

*Two-length selector*

Figures 11 to 14 shows a two-length selector which is particularly useful in shipping rooms where a large number of packages of the same dimensions are being handled. This two-length selector permits the delivery of a definite long length of tape upon pressing one of the keys and of a definite short length on pressing the other key. Each length can be adjusted by manual setting of a dial.

The two-length selector has a casing 400 which may be mounted on a standard as shown in Figure 1, or in any other location found convenient. A lead cable 190 leads from the casing to the control unit on the dispenser, as described in connection with Figure 1. At the top of the casing are two keys 196 which are preferably of the magnetically assisted type already described, and which are arranged to successively close the contacts of the spring pile-ups 211. Electrically connected with the long length key, which is one shown at the left of Figures 11 and 13, is a potentiometer type variable resistor 402 and connected with the short length key is a variable resistor 404. These resistors have shafts 406 and 408 on which are mounted respectively pointer knobs 410 for adjusting the long length resistor and 412 for adjusting the short length resistor. These knobs are mounted to move over dials 414 and 416 respectively. These knobs are set to the proper lengths on their respective dials and such lengths will be delivered each time the corresponding key is pressed, until a different dial setting is made.

The electrical connections for the two-length selector shown are in the main similar to the arrangement shown in Figure 10. Figure 16 shows schematically the key and variable resistor wiring which is incorporated into the main wiring system of the machine, in place of the multiple key board arrangement shown in Figure 10. As shown in this figure the short length key is the upper key 196 and the long length key is the lower key 196. Each of these has contacts a, b, c and d which are connected to the protective circuit, key solenoid 204, thyratron circuit and starting relay, as in the construction previously described. The short length circuit includes the variable dial-set resistor 404 and also preferably a compensating resistor 422 by which calibrations or adjustments may be made in order to make the length of tape which is dispensed when a key is depressed to correspond with the printed or engraved dial. In the circuit of the long length key is the dial-set resistor 402, and also preferably a compensating resistor 420. The compensating resistors 420 and 422 are preferably provided with screw driver adjustments or the like, as once the machine is properly adjusted these rarely need changing.

It is also frequently desirable to provide a means by which additional resistance may be added to the long length control circuit by which the maximum length of tape which the machine may deliver can be increased. In the construction shown in Figures 11 to 14 a switch 426 is provided on the front of the casing which will throw in or out a resistance 428 which may be either adjustable as shown, or may be a fixed resistance of definite value. If the maximum length of tape which may be fed using resistor 402 at the maximum dial setting is 33 inches as indicated, this may be increased in value by switching in the resistor 428 which might add another 30 inches in length. This will make the maximum deliverable length 63 inches and will also make any of the lower lengths indicated by the respective settings of the dial 414 greater by the 30 inch increment. With the arrangement shown, the short length key could be made to deliver any length from 6 inches or less within the capacity of the machine to 33 inches; while the long length key could be arranged to deliver any length between 33 and 63 inches with the switch 426 turned on.

*One key dial selector*

Figure 15 shows a length selector having one key and an adjusting knob 440 and dial 442. This construction can also have a switch 426 for throwing in or out a supplemental resistance used for extra long lengths of tape. This arrangement can be adjusted to deliver any desired length of tape up to the maximum and this length of tape will be delivered every time the key is pressed until a new setting of the dial is made.

Figure 1A:
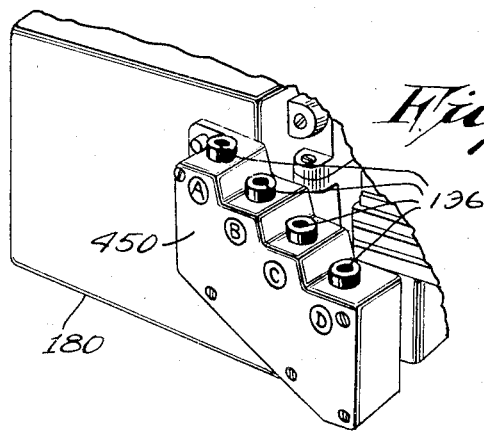
Figure 1A is a fragmentary perspective view of a tape feeding device having a modified key board arrangement thereon.
Figure 7:
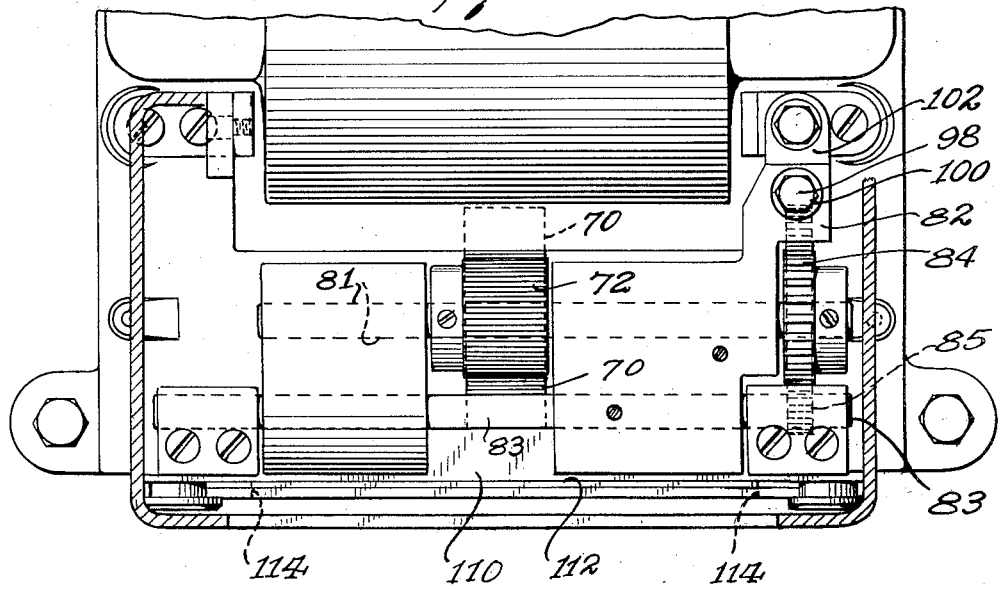
Figure 7 is a fragmentary view partly in plan and partly in horizontal section looking down on the tape feeding rollers and cutter.

Figure 1A shows a fragmentary perspective of a machine having a different multiple key arrangement than that shown in Figure 1. As illustrated, four keys are shown which are arranged in a stepped casing 450 mounted on the side of the machine. The wiring is the same as that shown in Figure 10.

By the use of the calibrating means or compensating resistors associated with the individual keys as described, it is possible to use any key set with any dispensing unit and make necessary adjustments to secure correct tape length delivery. A preferred procedure is to adjust each tape delivery unit and each key set unit to factory standards so that all units are interchangeable. Thus any tape delivery unit may be used with a multiple key set, a two key set or a one key set, by merely unplugging one key set and plugging in another.

The location of the switch 426 for introducing the additional length resistance on the key set unit rather than on the dispenser unit is desirable as it permits tape lengths to be wholly controlled directly from the point where the operator stands when using the apparatus.

While certain preferred embodiments of the invention have been illustrated and described in detail, it is to be understood that changes may be made therein and the invention embodied in other structures. It is not, therefore, the intention to limit the patent to the specific constructions illustrated, but to cover the invention broadly in whatever form its principles may be utilized.

What we claim is:

1. An apparatus for feeding measured strips of tape, including an intermittently operable feed device to feed the tape, means to actuate said feed device, an electrical timing circuit energizable coordinately with said actuating means, said timing circuit including a thyratron, means for maintaining a flow of current across the control gap of the thyratron at all times when the machine is in condition for operation, said current flow being insufficient to induce firing of the thyratron, means controlled by the timing circuit to cause the thyratron to fire after a predetermined interval, and means actuated by the firing of said thyratron to stop the feed of tape.

2. An apparatus for feeding measured strips of tape, including an intermittently operable feed device to feed the tape, electrical means to actuate the feed device to feed tape, an electrical timing circuit energizable co-ordinately with said electrical feed actuating means, said circuit including a capacitor, a thyratron and a specific resistance by which the time of firing of the thyratron is determined, means for maintaining a small current flow across the control gap of the thyratron at all times when the electrical system of the apparatus is energized so that the thyratron is maintained at all such times in a stabilized condition for firing upon build-up of the voltage applied to the main gap of the thyratron to a predetermined point, the time of said build-up depending upon the value of said specific resistance, and instrumentalities actuated on firing of the thyratron to stop the feed of tape.

3. An apparatus for feeding measured strips of tape including an intermittently operable feed device to feed the tape, electrical means to actuate said feed device to feed tape, a plurality of electrical timing circuits one of which is energized coordinately with said electrical feed actuating means, instrumentalities actuated by said energized timing circuit after a timed interval to stop the feed of tape and to sever the tape, a plurality of manually operable means each associated with a different timing circuit to initiate a feeding cycle and energize the timing circuit with which it is associated, and electrical protective means to prevent initiation of a second feeding cycle by manual operation of second manually operable means prior to the severing of the previously fed piece of tape.

4. An apparatus for feeding measured strips of tape including an intermittently operable feed device to feed the tape, means to actuate said device including an electrical feed initiating circuit, an electrical timing circuit, and control switch means for co-ordinately changing the conditions of said circuits, said control switch means including a sensing contact and at least one contact for controlling the conditions of said feed initiating and timing circuits, a protective circuit in which said sensing contact is included, and means controlled by said protective circuit for preventing the activation of the electrical feed initiating circuit and timing circuit by said control switch means, unless the closing of said sensing contact establishes that said protective circuit is in condition to permit proper institution of a feeding cycle.

5. An apparatus for delivering strips of tape of predetermined lengths including feed rolls for feeding the tape, a motor mounted to drive at least one of said rolls in tape feeding direction, at least one of said rolls being mounted for movement into and out of tape feeding relation, a cutter for severing the tape, and electrical means for controlling the delivery of predetermined lengths of tape and for causing the severing of the tape after feed of the tape has ceased, said means including a feed circuit, a cutter circuit, a stop circuit and a timing circuit, said feed circuit including instrumentalities moving said feed elements into tape feeding relation when said circuit is energized, said cutter circuit including a delayed action switch and having instrumentalities operating said cutter when said circuit is energized and said delayed action switch has operated, said timing circuit being energized when said feed circuit is energized whereby the feed of tape and the timing interval will start simultaneously, said timing circuit after a predetermined period being constructed and arranged to energize said stop circuit, said stop circuit including switch means constructed and arranged to break said feed circuit and thereafter to close said cutter circuit whereby feeding ceases and the tape is severed by the cutter.

References Cited in the file of this patent

UNITED STATES PATENTS

| | | |
|---|---|---|
| 536,730 | Mailloux | Apr. 2, 1895 |
| 1,703,056 | Brockway | Feb. 19, 1929 |
| 1,960,945 | Krueger | May 29, 1934 |
| 2,305,928 | Littell | Dec. 22, 1942 |
| 2,408,363 | Beckman et al. | Oct. 1, 1946 |
| 2,492,330 | Smith | Dec. 27, 1949 |

(Other references on following page)

UNITED STATES PATENTS

| | | |
|---|---|---|
| 2,506,262 | Arvidson et al. | May 2, 1950 |
| 2,569,281 | Besag et al. | Sept. 25, 1951 |
| 2,589,347 | Demerath | Mar. 18, 1952 |
| 2,594,670 | Mawney | Apr. 29, 1952 |
| 2,608,608 | Handschin | Aug. 26, 1952 |
| 2,616,501 | Smith | Nov. 4, 1952 |
| 2,623,589 | Price et al. | Dec. 30, 1952 |
| 2,629,440 | Shaw et al. | Feb. 24, 1953 |
| 2,655,372 | Hempel | Oct. 13, 1953 |
| 2,659,435 | Mansson | Nov. 17, 1953 |
| 2,727,570 | Hempel | Dec. 20, 1955 |
| 2,767,981 | Hempel | Oct. 23, 1956 |

FOREIGN PATENTS

| | | |
|---|---|---|
| 615,893 | Great Britain | Jan. 13, 1949 |
| 682,465 | Great Britain | Nov. 12, 1952 |